United States Patent

Korb

[11] 4,408,742
[45] Oct. 11, 1983

[54] HANGER FOR RECTANGULAR-SECTION DOWNSPOUTS

[76] Inventor: George P. Korb, 7518 Harford Rd., Baltimore, Md. 21234

[21] Appl. No.: 234,964

[22] Filed: Feb. 17, 1981

[51] Int. Cl.³ ............................................. F16L 3/08
[52] U.S. Cl. ................................. 248/74 R; 248/201
[58] Field of Search ................ 248/74 R, 73, 65, 201, 248/311.2, 300

[56] References Cited

U.S. PATENT DOCUMENTS

| | | | |
|---|---|---|---|
| 163,531 | 5/1875 | Roake . | |
| 1,085,421 | 1/1914 | Hiller | 248/300 X |
| 1,123,107 | 12/1914 | Darr . | |
| 1,403,551 | 1/1922 | Holloway et al. | 248/300 |
| 1,912,241 | 5/1933 | Abronski | 248/74 R |
| 2,826,385 | 3/1958 | Osborn | 248/300 X |
| 3,811,644 | 5/1974 | Arnault | 248/300 X |
| 3,936,001 | 2/1976 | Clendaniel | 239/289 |
| 4,094,483 | 6/1978 | Busch | 248/73 |

Primary Examiner—William H. Schultz
Assistant Examiner—Ramon O. Ramirez
Attorney, Agent, or Firm—John F. McClellan, Sr.

[57] ABSTRACT

An improved hanger for holding and protecting thin-wall rectangular-section downspouts provides a rectangular socket of first and second arms held in parallel-spaced relation by a strut for supporting three side portions of a downspout held in the rectangular socket by screws through the arms; extensions of the arms space the downspout held from a building structure or the like to which anti-twist wide stance out-turned feet secure the hanger by conventional fasteners.

1 Claim, 4 Drawing Figures

U.S. Patent  Oct. 11, 1983  4,408,742
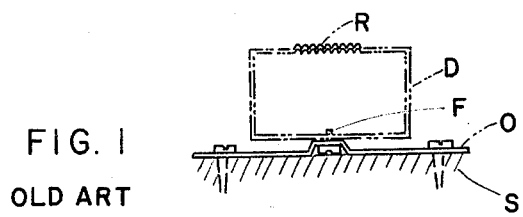
FIG. 1
OLD ART
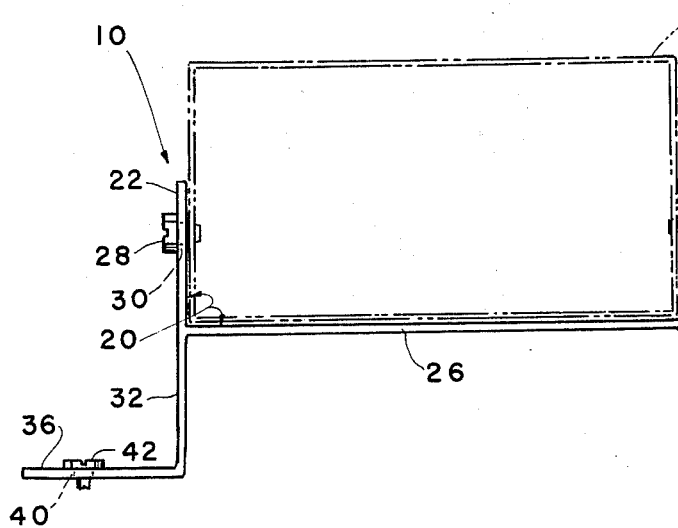
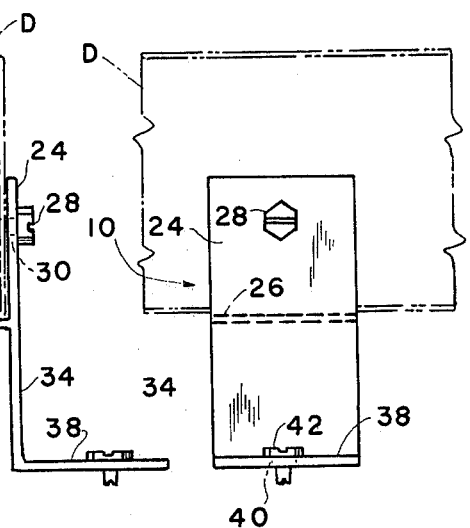
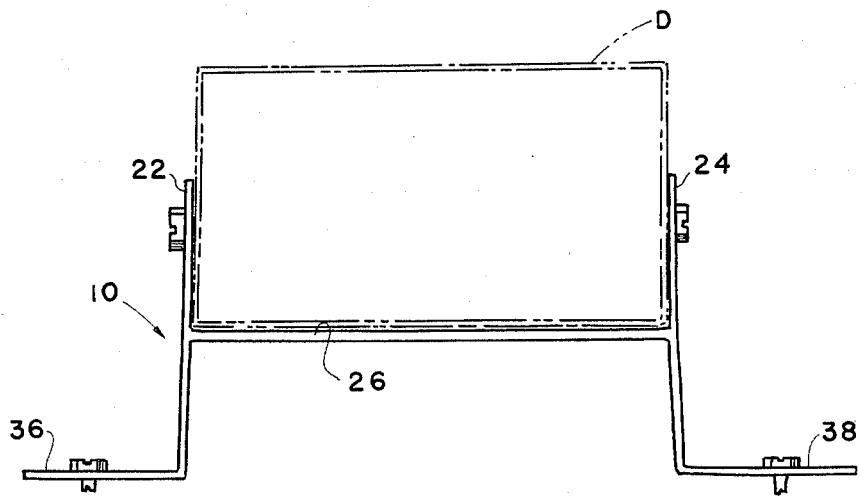

HANGER FOR RECTANGULAR-SECTION DOWNSPOUTS

FIELD OF THE INVENTION

This invention relates generally to holders and specifically to an improved hanger for rectangular-section downspout.

BACKGROUND OF THE INVENTION

Rectangular-section downspouts have been widely adopted for use on both industrial and domestic buildings in recent times. Usually they are made in standard sizes of light-gauge longitudinally-ribbed metal, precoated to resist corrosion and for decoration. However, these economical and attractive downspouts are not tough enough to withstand much force, and easily tear loose from their moorings, causing danger, inconvenience, and expense of replacement. Wind in particular causes them to vibrate and twist, and eventually to yield at intermediate points of fastening to a building, after which they fall free of the gutter at the top, sometimes tangling with trees or lines, and permitting water to gush freely in all directions from the gutter.

Loosening is sometimes done by children who may climb or tug on downspouts, and by heavy objects.

A principle object of this invention is to provide an improved hanger which will preserve and extend the installation and useful life of light-gauge metal rectangular section downspout.

PRIOR ART

In the prior art disclosure of holders of various types have been made including those of the following U.S. Patents:

U.S. Pat. No. 163,531 issued to D. Roake on May 18, 1875 discloses a "Y" shaped standoff holder with holes at the ends of the arms for fastening to the sides of a downspout;

U.S. Pat. No. 123,107 issued to F. J. Darr on Dec. 29, 1914, discloses a somewhat "H" shaped bar support which evidently could be used for downspouts and has holes for nailing through the feet and a pair of arms bordering a form-fitting socket;

U.S. Pat. No. 1,773,474 issued to C. M. Buller on Aug. 19, 1930, discloses framing at the sides of a conduit;

U.S. Pat. No. 2,368,619 issued to G. J. Solderberg on Feb. 6, 1945 discloses a clip-like retainer for co-action with a base to hold a conduit;

U.S. Pat. No. 3,936,001 issued to W. R. Clandaniel on Feb. 3, 1976, discloses (FIG. 6) a conduit holder wtih standoff and arms at the sides.

FURTHER OBJECTS

However, it is believed that no hanger for light gauge metal rectangular-section downspouts has been disclosed which gives the advantages of this invention in accordance with the objects of this invention, further objects being:

to provide a hanger as described which is vibration-resistant but lightweight, which reduces localized stresses, which is easy and economical to make, to install and to use, which is integral, strong, safe, damage resistant, and adaptable to be made in large and small sizes, which is attractive in appearance, which can be installed before, after, or together with downspouting to be held, and which can to some degree be sprung on installation by varying the foot spacing to provide looser or tighter fit as desired.

BRIEF SUMMARY OF THE INVENTION

In brief summary given as cursive description only and not as limitation the invention provides a rectangular socket of perforate arms joined by strut with arm extensions having apertured feet for spacing a rectangular-section downspout held in the rectangular socket from a building surface on which the feet secure.

BRIEF SUMMARY OF THE DRAWINGS

The above and other objects and advantages of this invention will become more readily understood on examination of the following description, including the drawings in which like reference characters refer to like parts.

FIG. 1 is a reduced-scale front elevational view of an old-art hanger holding a downspout shown in section view;

FIG. 2 is a front elevational view of a preferred embodiment with downspout indicated in phantom lines in section;

FIG. 3 is a side elevational view thereof with downspout fragmentarily shown;

FIG. 4 is a front elevational view showing an installation adjustment provision.

OLD ART

FIG. 1 shows an old art offset strip example of downspout hanger in use holding a downspout D to building structure S by outstretched arms O.

Because rectangular-section downspouting usually is of the type that is so thin and easily distorted and torn in use, it may have ribs, R formed to stiffen it for handling, the metal being as thin as fifteen to twenty thousandths of an inch (0.4 to 0.5 mm) thick and characteristically of relatively soft aluminum or mild steel. A blow from the side tends to sheer the metal at the fastener F and wind-caused vibration can have the same effect and rib the downspout loose.

DETAILED DESCRIPTION

FIGS. 2 and 3 show the invention 10 in contrast to the above scanty support, as comprising in preferred embodiment a length of extrusion, preferably clad aluminum or other strong, resilient, weather resistant material such as clad sheet steel, forming a rectangular socket 20 for supporting a rectangular section downspout on three sides.

For fitting and holding in this tear-resistant grip, the invention provides the rectangular socket 20 in the form of a first arm 22 joined to a second arm 24 parallel-spaced opposition by a strut 26 between them.

Width or depth as the case may be of the downspout D fits closely in between the arms 22, 24 and down against the strut 26 where it is firmly held by a sheet metal screw 28 through a hole 30 in the side of each arm.

Each arm has an extension of it in the same plane, for spacing the downspout free of the surface of the building structure, which extensions 32, 34 terminate in preferably outwardly turned respective feet 36, 38, each with a hole 40 for a nail or screw 42 or other suitable fastener for securing the hanger to a building structure.

FIG. 4 shows an advantage evident in this invention, tightening or loosening adjustment of the arms 22, 24 in gripping a downspout D, provided by springing the feet 36, 38 apart after the first fastener is applied by pulling on the opposite extension while driving the second nail or other fastener. Such pulling (or pushing if a wider spacing of the arms is desired) can pivot the arms 22, 24 about the strut 26 as a fulcrum. Preferably the extensions are straight extension of the arms.

Evident also is the clear access for driving the fasteners through the sides and through the feet regardless of whether the hanger 10 is installed before, after, or with installation of the downspout, for all of which it is well adapted. It is evident that the width of the hanger is substantially the same as the height from bottom of feet to top of strut so that with a little springing the hanger can be slipped under a downspout and rotated into holding position after the downspout is mounted at both ends by other means. It is also evident that the planar nature and mode of gripping of the parts of the hanger reduces localized stresses, and that the wide spaced support of the feet gives superior leverage for reducing twisting.

Material for the hanger may be 1/16 inch thick (0.4 mm) semi-tempered aluminum; for the most-used size of rectangular aluminum the arm (and arm extension) inside spacing may be 3¼ inches (8.1 cm); arm height above strut and strut height above foot mounting ace, and with all parts, may all be 1 inch (2.5 cm). Holes in the arms may be centered slightly nearer the top, say 9/16 inch (15 mm) up from the strut upper face, and may be similarly located in the feet.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. In a hanger for a downspout of rectangular cross-section, means for fastening a rectangular downspout to the hanger, and means for affixing the hanger to a building, the improvement comprising: means for preventing twisting and vibration-loosening of a said rectangular downspout held in the hanger, including: a rectangular socket of first (22) and second (24) arms and a strut (26) joining the first and second arms together parallel at a distance proportioned for gripping tightly the sides of a said rectangular downspout between the first and second arms, all said arms and strut being planar, said means for fastening being means (28) for securing a rectangular downspout tightly in the rectangular socket against the strut, said means for affixing including means (32, 34) for spacing free of a said building a said rectangular downspout held; the means (32, 34) for spacing including parallel extension (32, 34) of said first and second arms past the strut, a respective foot (36, 38) on the end of each extension at right angles thereto, said means for affixing including means (42) for attaching each foot to a building; each foot oriented outboard of the respective said extension; all said extensions and feet being planar and substantially of the same width and thickness as the arms and strut, said means (42) for attaching, including a structure defining a fastener hole (40) in each foot; and said parallel extensions (32, 34) of said first and second arms located for flexibly pivoting said first and second arms about said strut by springing apart said feet.

* * * * *